(12) United States Patent
Apprich

(10) Patent No.: US 6,250,013 B1
(45) Date of Patent: Jun. 26, 2001

(54) DEVICE FOR OPENING AND CLOSING AN OPENING IN A WALL

(75) Inventor: Harry Apprich, Ludwigsfelde (DE)

(73) Assignee: Apprich Secur 2000 GmbH (DE)

( * ) Notice: Subject to any disclaimer, the term of this patent is extended or adjusted under 35 U.S.C. 154(b) by 0 days.

(21) Appl. No.: 09/442,905

(22) Filed: Nov. 18, 1999

(30) Foreign Application Priority Data

Nov. 18, 1998 (DE) .............................................. 198 53 989
Aug. 6, 1999 (DE) .............................................. 199 38 378

(51) Int. Cl.[7] .................................................. E05F 11/34
(52) U.S. Cl. .............................................................. 49/362
(58) Field of Search .............................. 49/360, 362, 139, 49/140, 279, 280, 281

(56) References Cited

U.S. PATENT DOCUMENTS

| 5,434,489 | * | 7/1995 | Long et al. ........................ 49/139 X |
| 5,551,190 | * | 9/1996 | Yamagishi et al. .................... 49/360 |
| 5,644,869 | * | 7/1997 | Buchanan .............................. 49/362 |
| 5,832,669 | * | 11/1998 | Mizuki et al. ......................... 49/360 |
| 5,906,071 | * | 5/1999 | Buchanan .............................. 49/360 |

FOREIGN PATENT DOCUMENTS

WO97/44559   11/1997   (WO) .

* cited by examiner

*Primary Examiner*—Jerry Redman
(74) *Attorney, Agent, or Firm*—Marshall & Melhorn

(57) ABSTRACT

A device is proposed for opening and closing an opening in a wall by use of a sliding door, in particular for vehicles. The sliding door is arranged so as to be slidable essentially parallel to the wall by a guide device and drivable by a linear drive which comprises a linearly constructed element and a driving element engaged therewith. The linearly constructed element of the linear drive and a slide rail belonging to the guide device on the one hand are attached to the wall, and the driving element of the linear drive and a slider belonging to the guide device and engaged with the slide rail on the other hand are attached to the sliding door. The slider is attached to the sliding door by a joint.

18 Claims, 10 Drawing Sheets

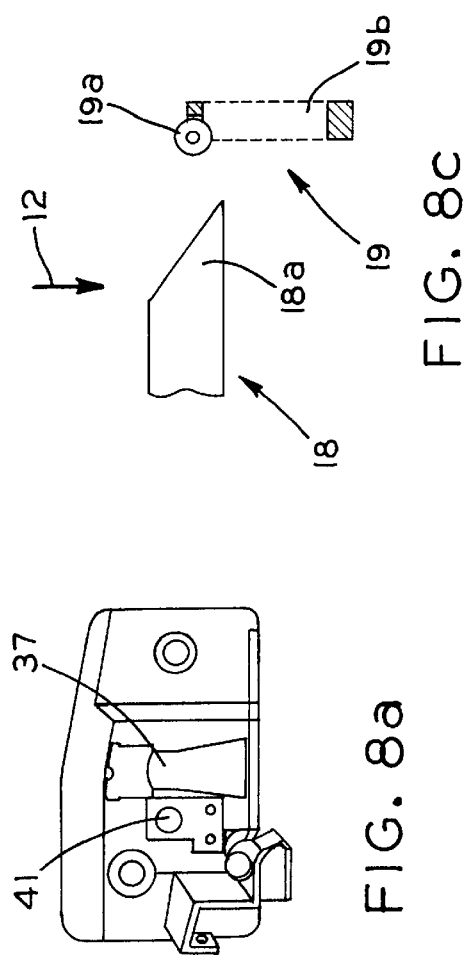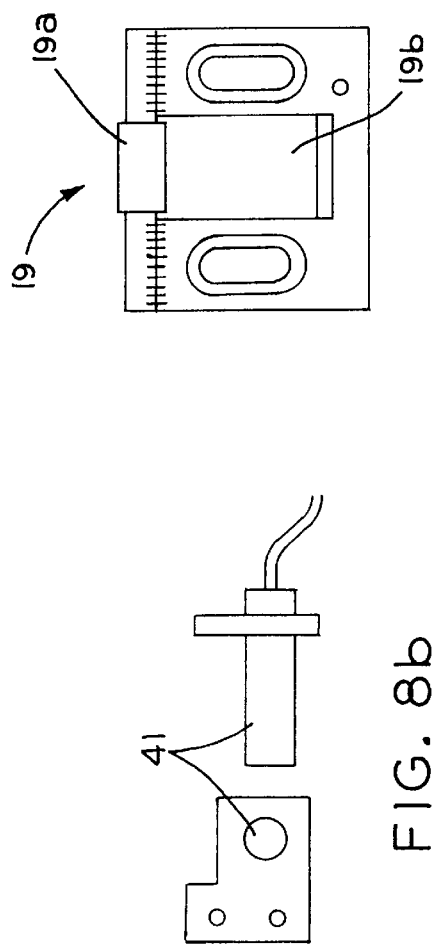

DEVICE FOR OPENING AND CLOSING AN OPENING IN A WALL

BACKGROUND OF THE INVENTION

1. Field of the Invention

The present invention concerns a device for opening and closing an opening in a wall by means of a sliding door according to the introductory part of the main claim.

2. Description of the Related Art

WO 97/44559 A1 discloses a device for opening and closing a sliding door, in particular for vehicles. The sliding door is slidable essentially parallel to the wall. The device is provided with a moving unit which performs the sliding movement of the sliding door and which comprises a linear drive provided with an electric motor and consisting of a rack and a gear as well as a guide device. In this case the rack of the linear drive and an element of the guide device on the one hand are attached to the door, and the gear of the linear drive and the other element of the guide device on the other hand are attached to a mounting which is supported by a support assembly connected to the wall. The support assembly converts a movement of the mounting essentially perpendicularly to the wall to a pivot movement. Furthermore there is provided a locking unit which is driven by preferably an additional electric motor and which locks and unlocks the sliding door in its position closing the opening, performing a movement perpendicularly to the wall. A control device comprising position switches controls the moving and locking units.

This sliding door according to the state of the art has proven itself to a high degree particularly for security transport vehicles, as sliding doors with a high mass can be moved reliably and quickly by this means. However, the construction is relatively elaborate, and economical use for the manufacture of everyday vehicles on a large scale does not appear to be possible.

OBJECT AND SUMMARY OF THE INVENTION

Starting from this state of the art it is the object of the present invention to provide a device that can be used in the manufacture of everyday vehicles on a large scale for opening and closing an opening in a wall by means of a sliding door which, using as few components as possible, allows reliable electric opening of sliding doors. Moreover, existing everyday vehicles which have sliding doors to be opened manually are to be capable of being provided with electric sliding doors with minimum conversion work.

This object is achieved by a device with the features of the introductory part of patent claim 1 in conjunction with the characterizing features of patent claim 1.

Due to the fact that the linearly constructed element of the linear drive and a slide rail belonging to the guide device on the one hand are attached to the wall, and the driving element of the linear drive and a slider belonging to the guide device and engaged with the slide rail on the other hand are attached to the sliding door, wherein the slider is attached to the sliding door by a joint, a vehicle with a device according to the invention for opening and closing an opening in a wall by means of a sliding door has only minimal modifications compared with existing everyday vehicles with sliding doors to be opened manually. The existing slide rail can be used as the slide rail belonging to the guide device in nearly all mass-produced vehicles. Similarly, as a rule the slider which is engaged with the slide rail can continue to be used. The linearly constructed element of the linear drive can very easily be mounted on the existing slide rail without work on the vehicle body being necessary. The motor necessary for driving the sliding door can easily be mounted permanently on the side of the sliding door oriented towards the vehicle interior. Further conversion work such as perhaps the replacement of existing locks etc. is not necessary, so that extra costs which would have to be incurred by official acceptance in case of conversion work are eliminated here too.

Advantageous developments of the present invention are given in the dependent patent claims.

A particularly advantageous embodiment provides that the slide rail or the linearly constructed element of the linear drive at one end extend as far as the opening and at this end are curved in the direction of entry to the opening. By this means, in the simplest manner conceivable movement of the sliding door perpendicularly to the opening is made possible. Particularly with modern sliding door vehicles which already have a slide rail which at one end extends as far as the opening and is curved in the direction of entry to the opening, e.g. a correspondingly shaped rack can easily be fitted on the slide rail without work on the vehicle body being necessary. Advantageously the slide rail combined with the linear element is mounted in the central region of the wall behind the door opening.

A further advantageous embodiment of the invention provides that the electric motor is connected by a gear mechanism to a linearly constructed element designed as a rack. The multi-step character of the gear mechanism here allows, depending on requirements, easy adaptation of the traveling speed of the sliding door or of the force applied to the sliding door for sliding, by varying the gear ratio.

A particularly advantageous embodiment provides that the slide rail is made of steel sheet and the rack profile is pressed into the slide rail. By this means, manufacture of the linearly constructed element of the linear drive at minimal cost is made possible, and also optimum coordination with the slide rail is ensured, as the rack becomes an integral part of the slide rail.

Finally a further advantageous embodiment provides that cover device are installed to minimize the entry of dirt into the sensitive region of the rack or gear mechanism. To protect the interior of a slide rail, which can be provided in the interior e.g. with a rack, lamellae which corotate in accordance with the slider movement such as are used e.g. in the case of control levers of the automatic transmission in motor vehicles can be used. To minimize soiling in the region of the gear mechanism, elastic capsule seals which encase the whole gear mechanism of the linear drive (if desired including the motor) with an elastic plastic film can be provided.

In a further embodiment there are provided a holding device for fixing the sliding door in the closed position closing the opening, an engaging device comprising two engaging elements that can be engaged with each other with mating slide surfaces for producing a door movement essentially perpendicularly to the wall, wherein one engaging element is arranged on the door and one on the wall and the engaging elements can be disengaged from each other in the closed position, and a control device connected to the engaging device for controlling the movement of the door, which controls the engaging elements as a function of fixing of the sliding door in the holding device in such a way that they become disengaged. With such an arrangement, in the event that the force of the drive motor of the door is not sufficient, the door can be fully closed, e.g. provided with a pull-shut aid which however does not lock the door unwanted. The holding device can in this case be the lock which is present on the motor vehicle.

Advantageous developments of the present invention are given in the dependent claims.

An advantageous embodiment provides that the holding device is constructed as a pin attached to the sliding door or to the wall, which can be latched in a lock attached to the wall or to the sliding door in such a way that in the latched state the door movement in the direction of opening is blocked. This embodiment is usually also chosen for manually operated sliding doors of the original motor vehicle fitters. Particularly in the case of mass-produced vehicles which are available optionally with manually operated or electric sliding door, it is thus possible by this means to use standard locks. This also means that in case of conversion new locks are not necessary. With the retention of the original locks, therefore, extra costs which would have to be incurred by official acceptance in case of conversion work can thus be eliminated.

A further advantageous embodiment provides that one engaging element is of hole-like construction (preferably in the wall) and the other engaging element is of rod-like construction (preferably on the door) with a beveled point, wherein at least one of the engaging elements (preferably the rod-like one) can be driven by an electric motor. It is particularly advantageous that the engaging element of hole-like construction comprises in the region of contact with the rod-like engaging element a rotatable annular roller which is arranged in such a way that, when the rod-like engaging element slides over the peripheral surface of the roller, the roller turns. Hence a long life of the sliding parts is achieved by the fact that, due to the rotating capacity, the friction resistance of the paired assembly is extremely reduced and moreover the roller is worn down not just at a single point, but evenly around its circumference.

A particularly advantageous variant of the invention provides that the control device comprises a lock sensor which signals a latch position of the lock, preferably the first snap-fit position in which the closed position is not yet fully reached. This signal is to be used as a start signal for outward movement of the rod-like engaging element and hence essentially vertical shutting of the door or tilting of the door into the closed position.

It is further advantageous that on at least one of the engaging elements, preferably on the rod-like engaging element, is mounted an engagement sensor belonging to the control device for detecting the position of the engaging element. Such a position sensor fulfils several functions. Firstly it im possible that by this means self-locating of the engaging element is obtained, perhaps in order to fix a definite position of the engaging element, perhaps after a power failure (this is preferably the non-outward position). Moreover it is advantageous to establish the position determined by means of the engagement sensor on outward movement of the rod-like engaging element into the mating hole-like engaging element. In a predetermined outward state of the rod element, which is wedge-shaped at the tip, into the other engaging element, it can be reliably assumed that the door is in the closed position (the latter is held by the holding device) and then the rod-like element can be pulled back into the non-outward position again, so that emergency opening is easily allowed.

A particularly advantageous embodiment provides that the sliding door comprises a lock linkage that can be connected to the lock for unlatching pin and lock of the holding device. Such a lock linkage which connects the lock to the door handle for opening of the door is already as a rule provided by the original motor vehicle fitter. In this case it is highly advantageous that the lock linkage is connected by a driver connection acting in one direction to the rod-like engaging element. In this way it can be ensured that only when the rod-like engaging element is moved out in a given direction is the lock linkage actuated and hence the lock is unlatched.

BRIEF DESCRIPTION OF THE DRAWINGS

Further advantageous developments are given in the other dependent claims. The present invention will now be described with the aid of several figures. They show:

DESCRIPTION OF THE PREFERRED EMBODIMENT

Figure 1:
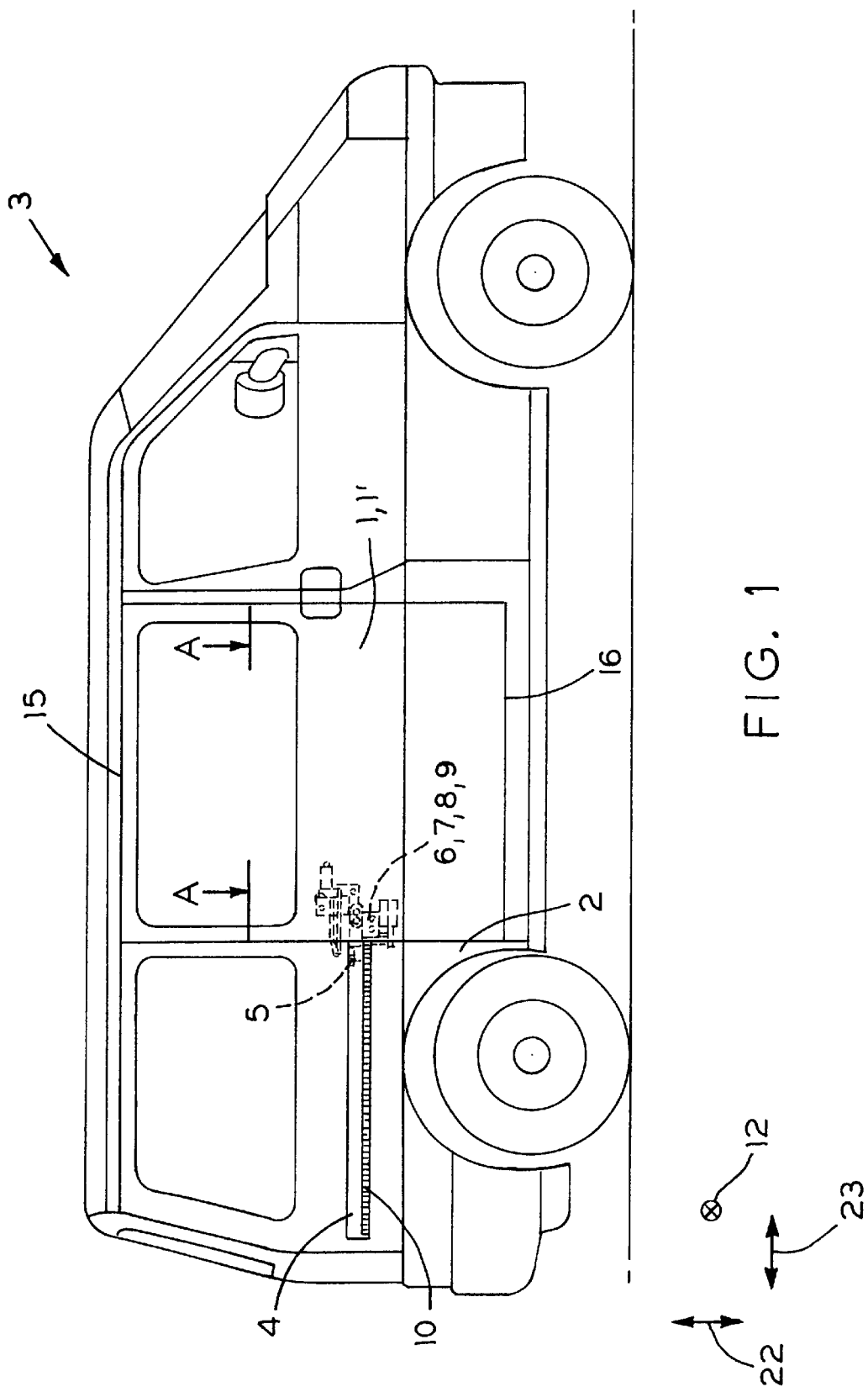
FIG. 1 a side view of a vehicle with a sliding door.

FIG. 1 shows a vehicle 3 which on one side of the vehicle comprises a sliding door 1. The sliding door 1 closes an opening 1' of the same size in the wall 2 of one side of the motor vehicle. In the present case the right side of the vehicle is shown, but the vehicle can also have an identical sliding door (except for inverse modifications) on the left side of the vehicle. The sliding door 1 is movable essentially parallel to the wall 2 in a direction 23 parallel to the longitudinal axis of the vehicle 3. For this purpose at the upper edge and lower edge of the sliding door are provided longitudinal guides 15 or 16, not shown in more detail. In addition the sliding door is guided by a slider 5 which is pivotably attached to the sliding door and which runs in a slide rail 4. Guiding takes place in such a way that the sliding door is supported by the slider 5 in a vertical direction 22 and stabilized in a direction 12 perpendicularly to the sliding door or wall. The door is slid by means of a linear drive comprising a rack 10 and an electric motor 6 with subsequent gear mechanism 7, 8, 9, which is considered in detail below.

Figure 2:
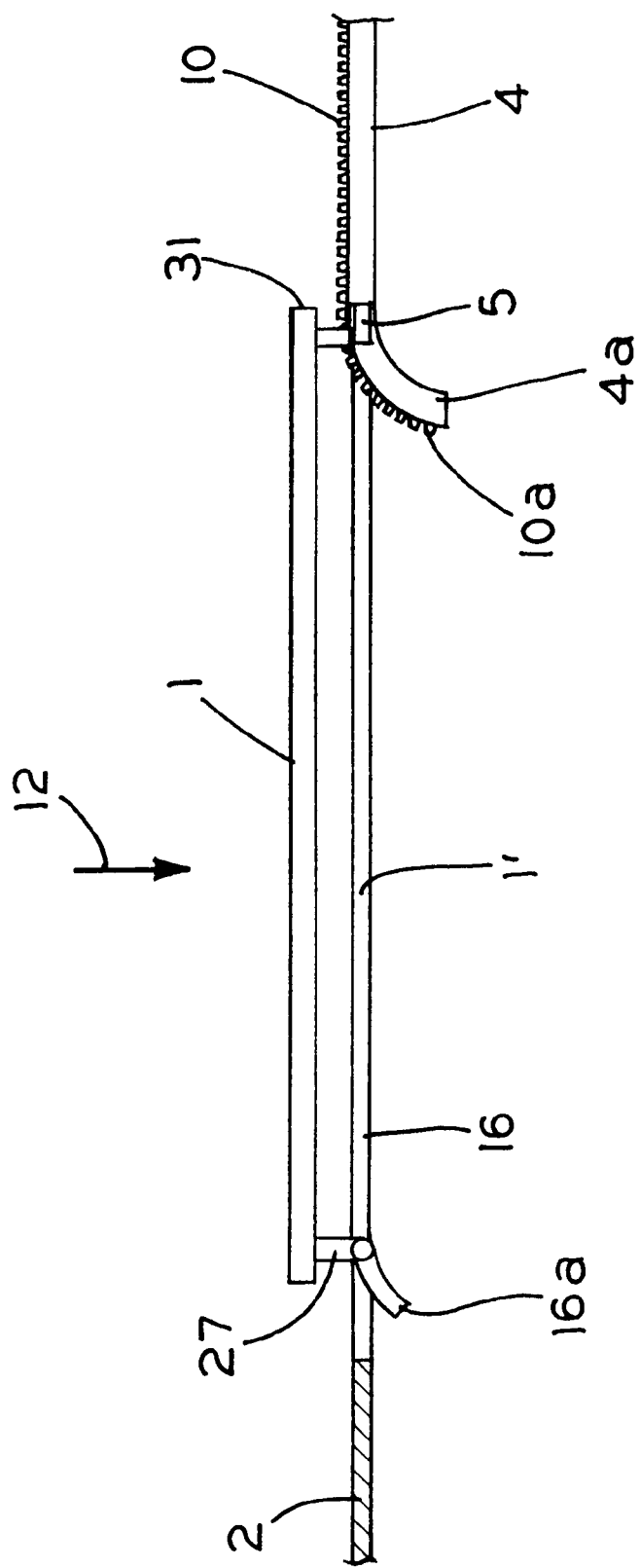
FIG. 2 a section through the sliding door from FIG. 1 along A—A.

FIG. 2 shows a section A—A of the sliding door 1 from FIG. 1, the elements of the linear drive 6, 7, 8, 9, 10 not being shown for reasons of simplification. It is shown that the sliding door 1 comprises a bracket 27 which engages in a mating guide rail 16 of the vehicle wall 2 and is thereby supported in the vertical direction 22 and stabilized in the lateral direction 12. Moreover the guide rail 16 is curved in its end region 16a, so that the sliding door 1, when it approaches the state of register with the opening 1', is guided in a direction 12 towards the wall. A corresponding approach to the wall 2 is also achieved by the curved shape of the slide rail 4. Connected to the slide rail 4 is a rack 10 which corresponds in shape to the slide rail 4. In the slide rail 4 is guided the slider 5 which is permanently pivotably connected to the sliding door. The slide rail 4 and the rack 10 at their ends 4a or 10a extend as far as the opening 1'. At this end the slide rail 4 and the rack 10 are curved in the direction of entry 12 to the opening 1'. When the sliding door 1 approaches the state of register with the opening 1', the sliding door 1 is moved towards the wall 2 by the slider 5 which is guided in the slide rail 4, as the slider 5 is (pivotably) connected to the sliding door 1.

Figure 3A:
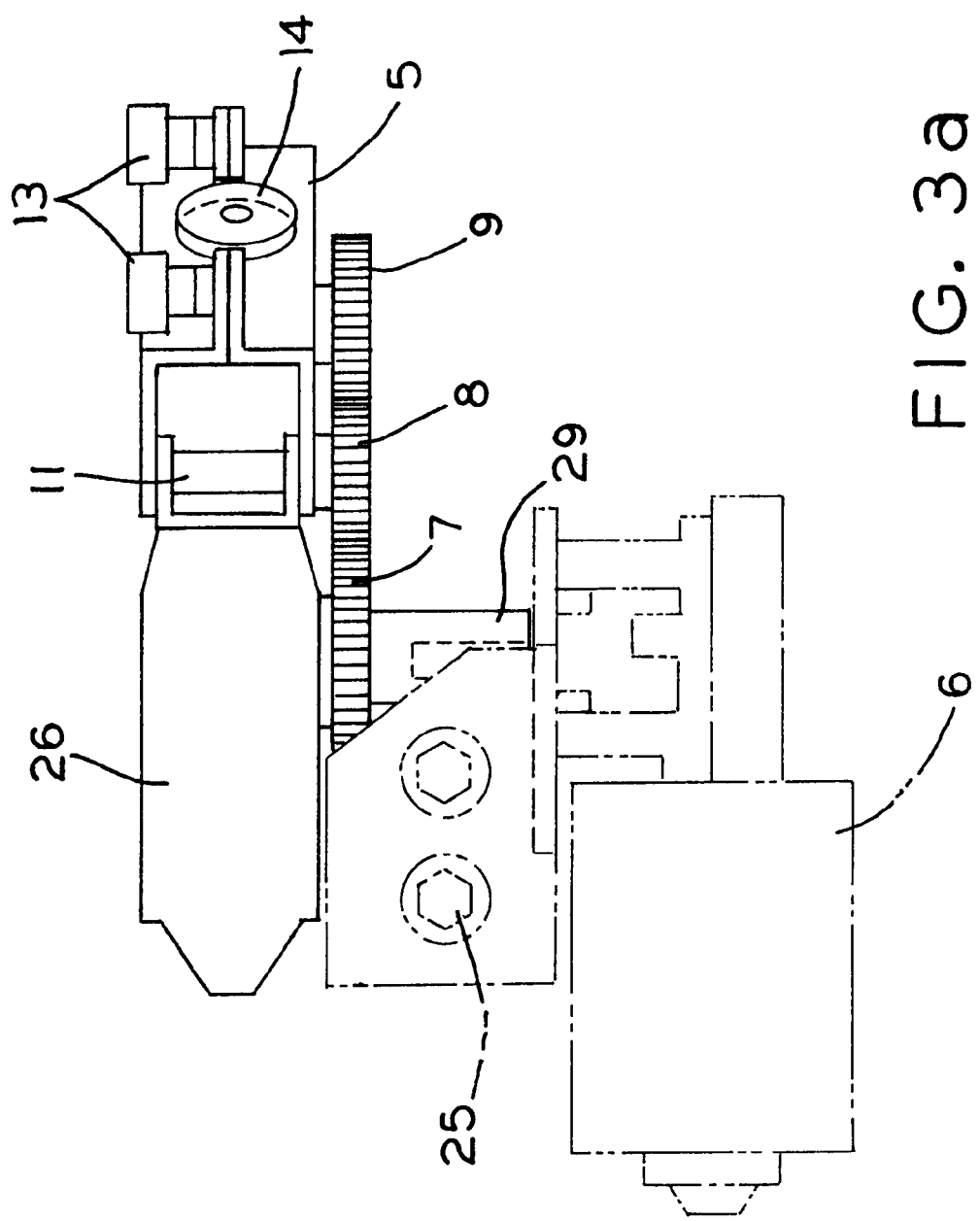
FIG. 3a a detail view of parts of the linear drive and slider.

FIG. 3a shows a precise detail view of the slider 5 and of the driving parts of the linear drive. A driving electric motor 6 which is mounted permanently on the sliding door by means of bolts 25 is here shown in broken lines. The electric motor 6 drives a shaft 29 on which is non-rotatably mounted a gear forming a pinion 7. The shaft 29 is held in a carrier portion 26 which is also mounted permanently on the sliding door. For this purpose a pin of the shaft 29 engages in a mating opening of the carrier portion 26. The pinion 7 drives an additional gear 8 which is arranged rotatably on the axis of a joint 11 between the sliding door (the carrier portion 26) and the slider 5. The joint 11 is constructed as a bolt connection. In the region of the joint 11 the carrier portion 26 comprises a "C"-shaped connecting portion, and both arms of the "C" have bores for receiving the bolt. The adjoining slider B has in the connecting region a connecting portion in the form of an inverted "C" whose arms also have bores. The arms of the inverted "C" encompass the arms of the "C" of the carrier portion 26, and through them together passes a bolt which extends in a vertical direction. This ensures that the slider can transmit forces in a vertical direction 22 and so the sliding door 1 can be supported by the slider 5. The bolt connection 11 thus fulfils two functions: firstly it forms the pivotable supporting connection between carrier portion 26 and slider 5, and secondly it is the axis of rotation for the gear 8. The gear 8 in turn drives a gear 9 which engages in the rack 10 or a rack profile 10' (see FIG. 5). The gear is mounted rotatably in the main body of the slider 5 (e.g. a threaded pin projecting laterally from the gear 9 is inserted in a mating bore of the main body of the slider 5 and fixed axially).

Figure 3B:
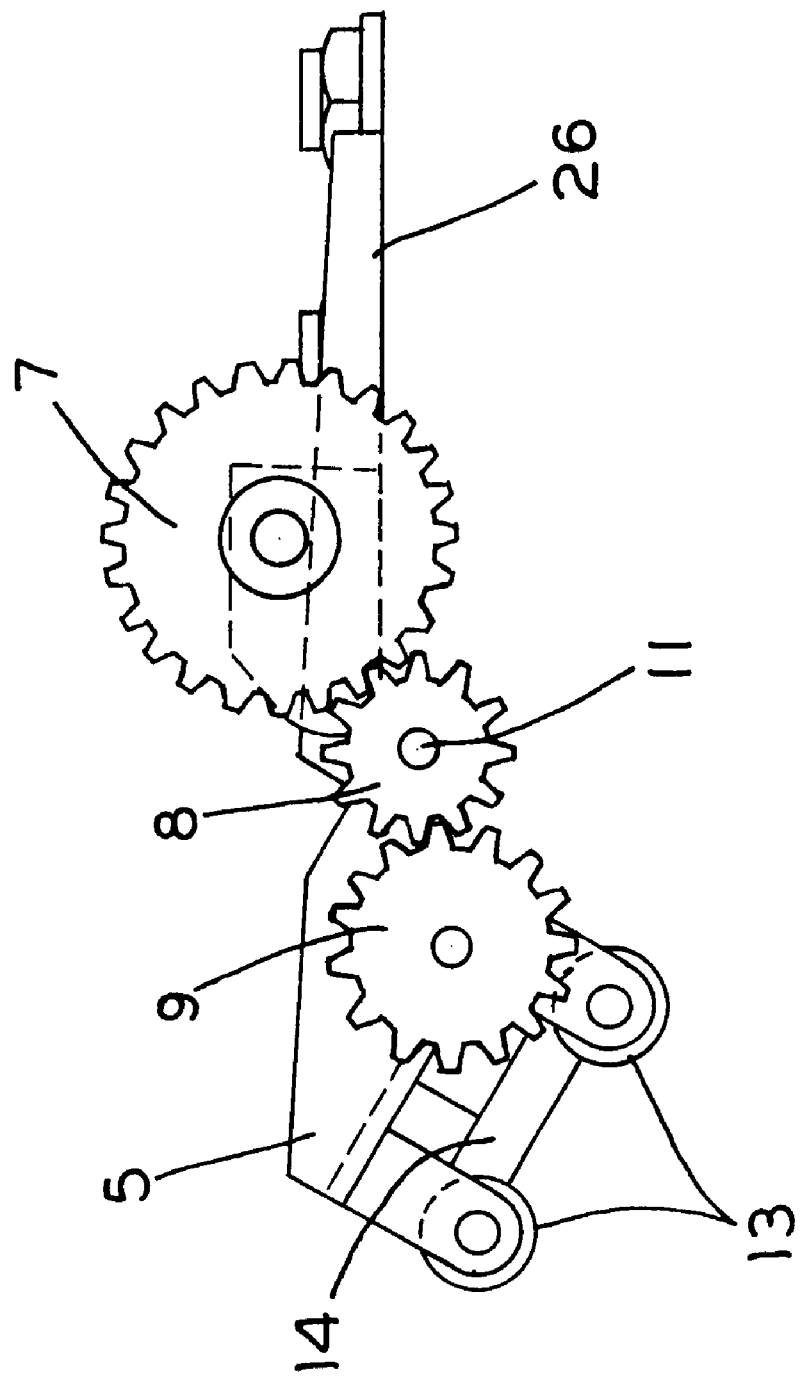
FIG. 3b a bottom view of parts of the linear drive and slider.

FIG. 3b shows a bottom view of the elements not in broken lines from FIG. 3a. Here can be seen the meshing gears 7, 8 and 9. The slider carriage 5 comprises lateral guide rollers 13 and a supporting roller in a vertical direction 14. Slider 5 and carrier portion 26 are connected to each other by the joint 11. The gear 7 comprises e.g. 28 teeth, the gear 8 e.g. 4 teeth and the gear 9 e.g. 17 teeth. These values may however vary, depending on the speed or torque of the electric motor 6.

On rotation of the slider 5 about the joint 11, such as happens e.g. on passing through the curved end region 10a or 4a of rack or slide rail, in case of large angles of rotation there could theoretically be contact of the gears 7 and 9. To prevent this from the outset and so also allow the use of any gear combinations, it is also possible to offset the gears 7 and 9 from the axis of the gear 8 (i.e. the joint axis 11) laterally (preferably by the width of the wider gear). As a result a wider design of the gear 8 is necessary. With this arrangement, however, practically any angles of rotation between slider 5 and carrier portion 26 are then possible.

The slider 5 comprises the two guide rollers 13 which are guided on side surfaces 13' (see FIG. 4) of the slide rail 4 for lateral stabilization of the sliding door. The supporting roller 14 supports the weight of the sliding door in direction 22 (that is, in a direction perpendicularly to the direction of sliding of the sliding door). For this purpose the roller 14 in the fitted state rolls over a main surface 14' (see FIG. 4) of the slide rail 4.

Figure 4:
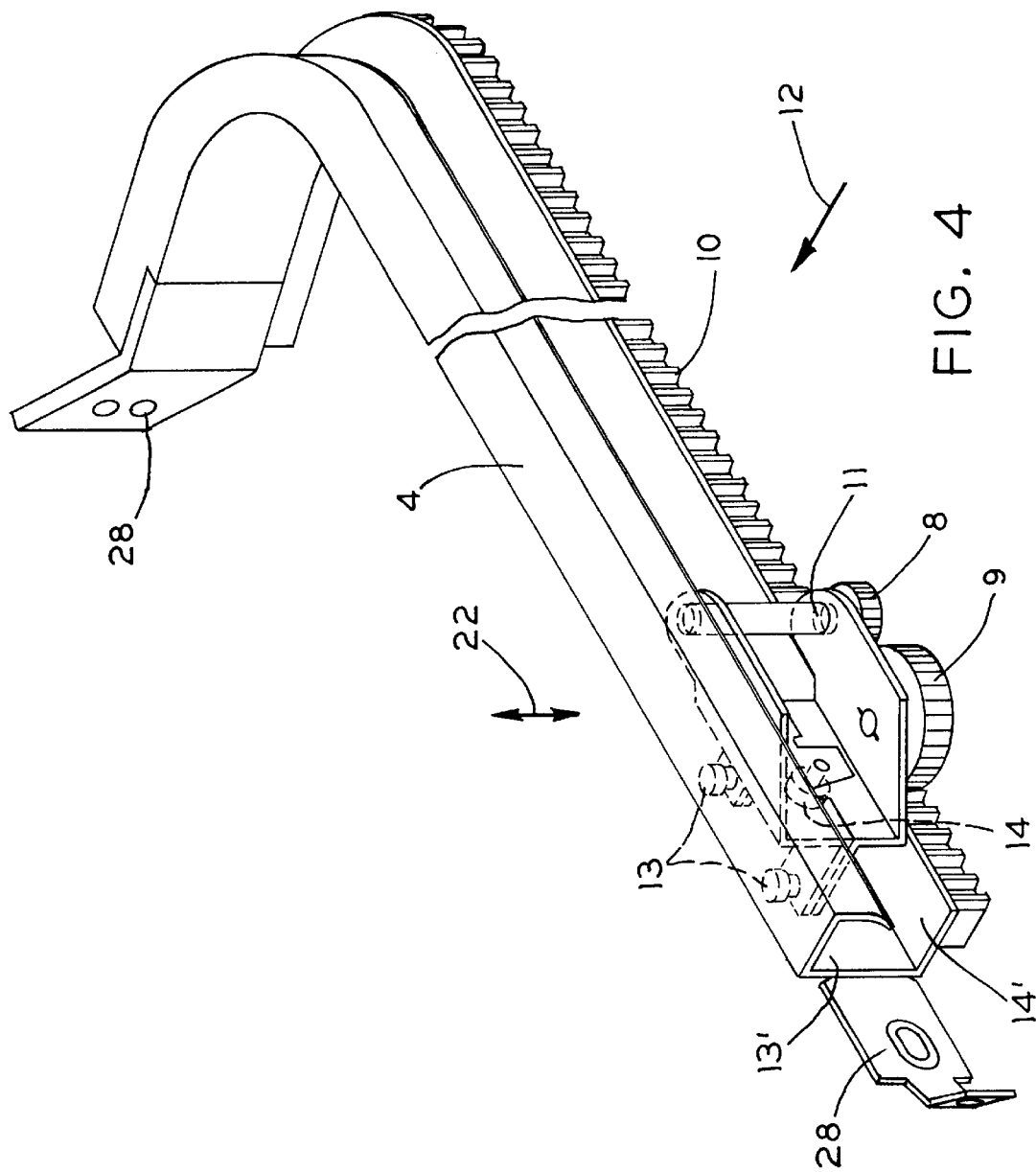
FIG. 4 a slide rail according to the invention with glued-on rack with inserted slider, FIG. 5 a further embodiment of a slide rail according to the invention with stamped rack profile as well as a dirt cover, FIG. 6 an interior view of the sliding door, particularly of engaging device and holding device, FIG. 7 a detail drawing of the interior view according to FIG. 2 additionally showing components of the linear drive device, FIGS. 8a–8d individual views of the holding device and engaging device, FIG. 9 a schematic view of the holding device and engaging device in the fitted state.

FIG. 4 shows a slide rail 4 according to the invention. The slide rail 4 is constructed as an easy-to-manufacture steel sheet member (bending, deep-drawing, etc. are possible as cheap shaping processes). On the lower side of the main surface 14' is integrally formed a rack 10 which extends over the whole length of the slide rail, that is, also over the curved region in the region of the end 4a of the slide rail (see FIG. 2c). In the case of other constructions it is of course also possible to weld, bolt, glue, etc. the rack on.

Figure 5:
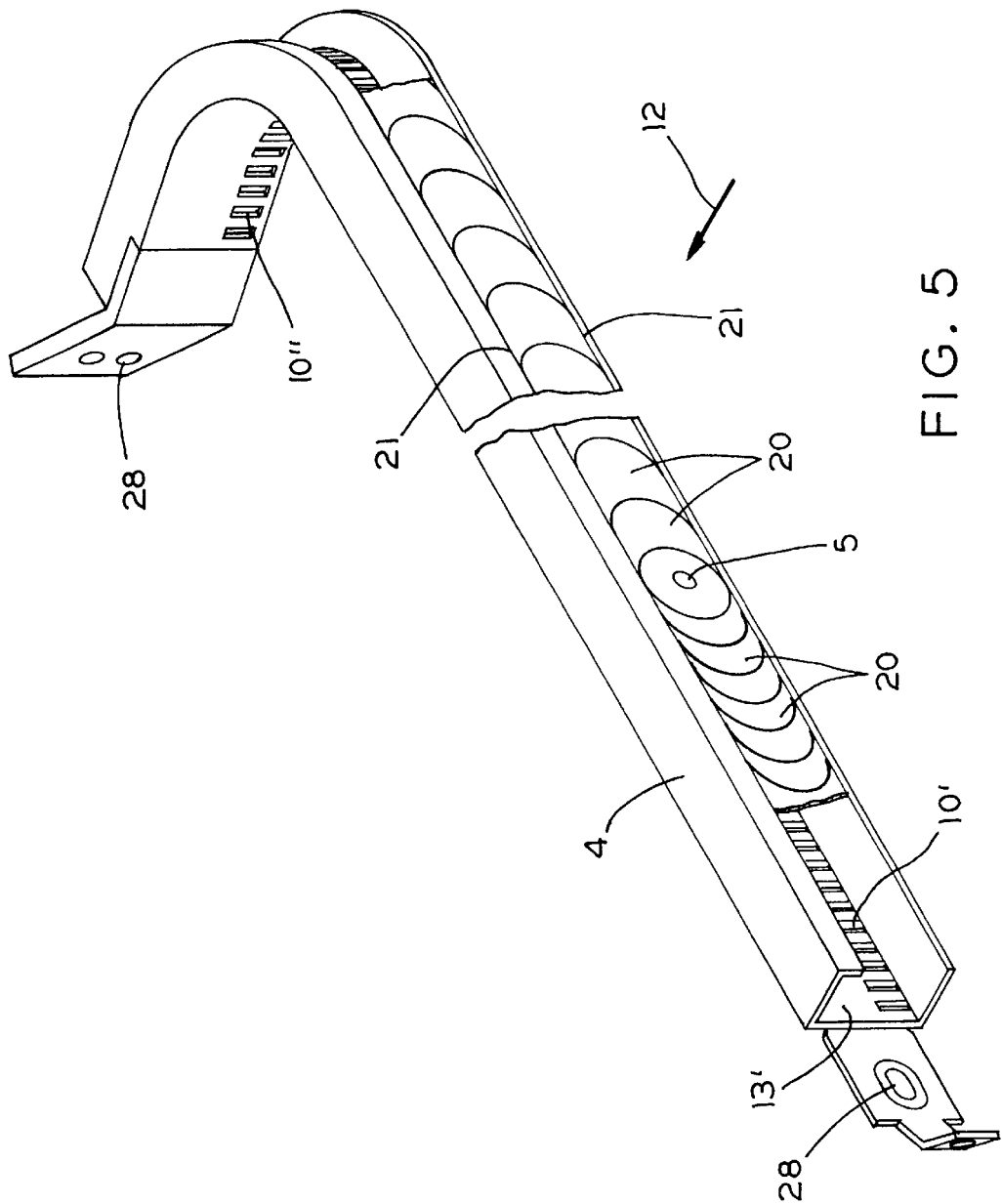

FIG. 5 shows another embodiment of a slide rail 4 with rack according to the invention. Here the rack profile 10' is stamped over the whole length of the slide rail 4 in a side surface 13' of the slide rail 4 (that is, also in the curved region, see reverse side of the rack profile 10"). The slide rail 4 is bolted fast to the wall 2 of the vehicle 3 or otherwise joined to it (this also applies to FIG. 4) by means of bores, not shown, which are inserted through doors 28. Preferably the slide rail according to FIG. 1 is held in a groove in the central region of the wall behind the door opening. It is also conceivable for it to be mounted at another location of the supporting region of the door.

FIG. 5 also shows a device for minimizing the entry of dirt in the region of the rack or of the stamped rack profile 10'. The side surface which is the only open one in the cross-section of the slide rail comprises at its upper edge and its lower edge longitudinal guides 21 in which are guided partition lamellae 20 which slide in the longitudinal guide. These lamellae extend over the whole length of the slide rail 4. One lamella comprises an opening through which the connection is made between the slider carriage 5 and the carrier portion 26. This lamella is rigidly connected to the slider 5. When the slider 5 in FIG. 5 moves to the left, there is a decrease in the distance between the individual lamellae 20 which are located on the left side of the slider, and correspondingly the distance between the lamellae 20 on the right side of the slider 5 increases.

It is however also possible to protect parts of the linear drive (e.g. the particularly delicate gears) against the entry of dirt. For this purpose these are surrounded by an elastic capsule seal (e.g. rubber bellows).

The sliding door 1 is opened and closed by a control device, not shown, belonging to the sliding door. The switch commands for opening and closing the door can be triggered by electrical switch which are accommodated on the sliding door itself or in the region of the control console of the driver of the vehicle 3. The sliding door moreover comprises means to prevent jamming, which switches off the electric motor 6 or reverses its direction of rotation if the sliding door does not reach a predetermined end position (e.g. the fully open or fully closed position in which the sliding door 1 conceals the opening 1') within a predetermined time. Jamming can be further prevented by the fact that within a travel distance located between two limit switches (the latter switch whenever the door is fully open or fully closed) the sliding door is acted upon by a force which is opposite the sliding movement of the sliding door and which is higher than a predetermined reference force. This reference force can be adjusted according to the legal requirements.

Depending on the embodiments of the vehicles, it may be that a relatively high force of the linear drive is necessary to bring the sliding door 1 into register with the wall 2 in the region of its rear edge 31. An engaging device acting as a pull-shut aid, which is described in more detail below, serves to assist the sliding door movement in direction 12 in the region of the curvature of rack and guide rail.

Figure 6:
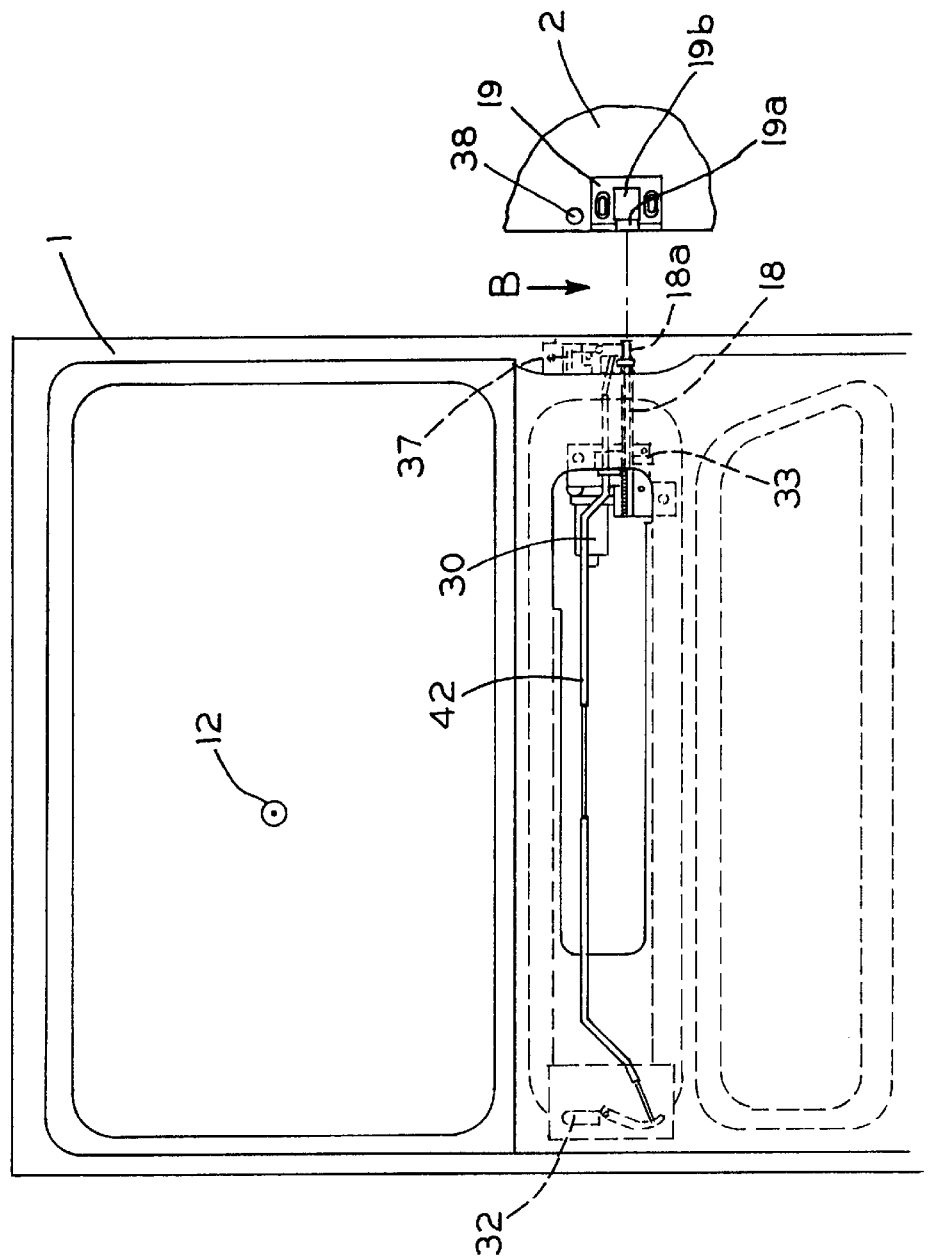

FIG. 6 shows the view of a sliding door 1 from the interior of the vehicle 3. In FIG. 2 the center of gravity is located on the representation of a holding device for fixing the door and engaging device. The holding device includes a lock 37 attached to the inside of the door 1. Attached to the wall 2 is a pin 38 which is constructed partially in form-locking relationship with the lock 37. When the sliding door 1 approaches the wall or the pin 38, the pin 38 latches in the lock 37. In this first latch position there still remains a small gap between wall 2 and door 1, and the closed position is not yet fully reached. Already in this first latch position it is no longer possible to open the door without unlatching the lock. In the completely closed position, i.e. when the sliding door 1 lies flush against the outside of the vehicle 3 (i.e. the wall 2), the pin 38 is in a second latch position of the lock 37.

A lock linkage 42 is connected on the one hand to the lock 37 and on the other hand to a handle 32 located on the outside of the vehicle. On operation of the handle or pulling on the lock linkage 42, unlatching of the pin 38 in the lock 37 takes place. In addition to the lock linkage and the handle, the holding device also comprises a locking device for blocking the lock linkage 42. By this means it is possible to protect the lock against unlatching, whether by operation of the handle 32 or electrically. The holding device can be taken over practically complete from mass-produced vehicles with manually operated sliding door. This applies to the lock 37, the pin 38, the lock linkage 42, the handle 32 and the locking system, perhaps an ordinary central locking system. Naturally other embodiments of lock and pin are conceivable too, e.g. it is possible to attach the pin to the door and the lock to the wall, etc.

In FIG. 6 is also shown an engaging device which consists of a linearly slidable rod 18 mounted on the door side and an opening of recess 19 mounted on the wall. The tip 18a on the rod 18 is bevelled on the side directed towards the engaging element 19 in FIG. 6. As a result, when the rod 18 is slid into the recess 19 the sliding door is simultaneously pulled in direction 12 and so the drive mechanism of the sliding door is assisted.

Figure 7:
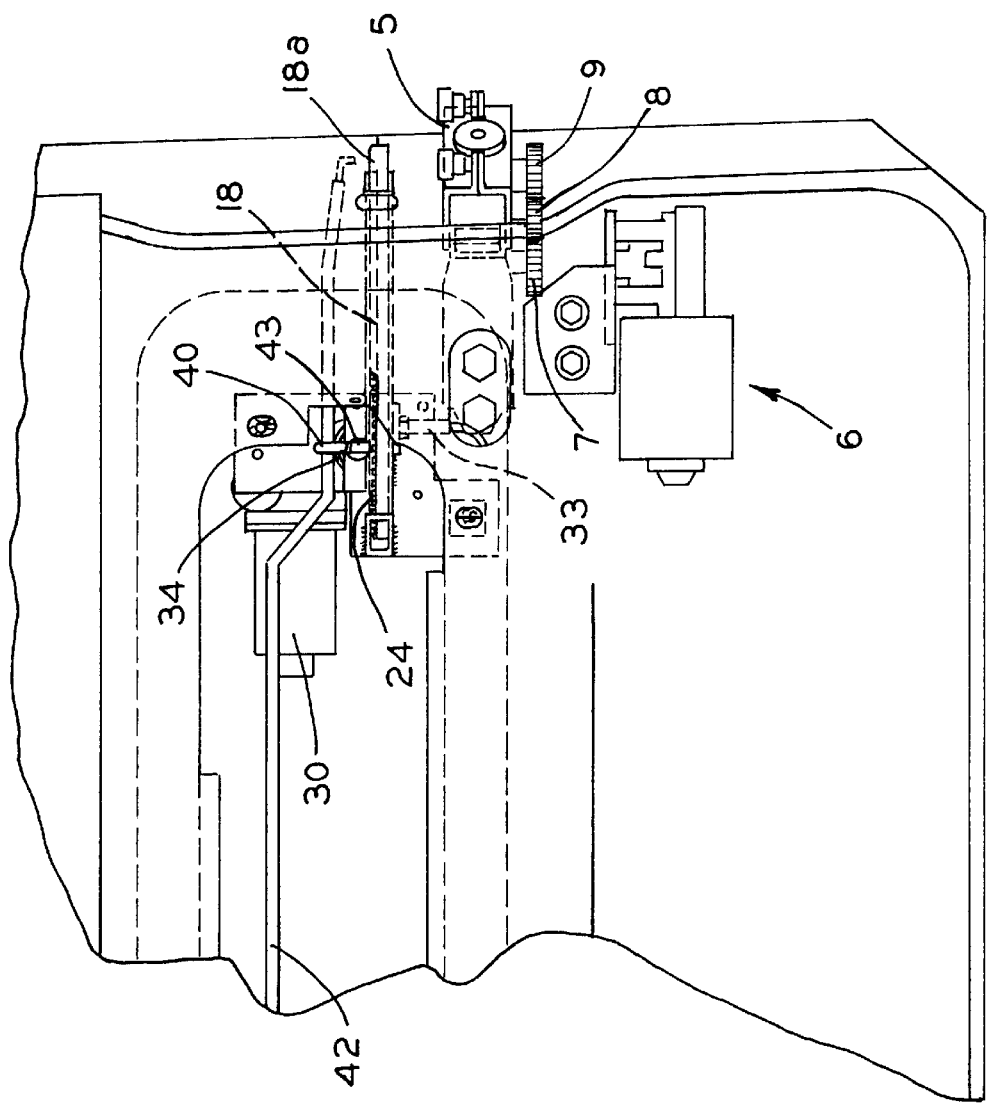

FIG. 7 shows an enlarged view corresponding to FIG. 6, in which can additionally be seen parts of the linear drive which are attached to the door. The sliding door is essentially hollow and largely accommodates the rod 18, a lateral hole being used for passage of the tip 18a. On the side of the rod 18 opposite the tip is formed a rack profile 24 with which meshes a gear 34 driven by the electric motor 30, to slide the rod 18 relative to the door in a horizontal direction (referred to FIG. 7). An engagement sensor 33 which is attached to the door detects the sliding or outward state of the rod 18 relative to the door. The engagement sensor for detecting the position of the rod 18, which belongs to the control device for opening and closing the door, will be considered in detail below.

FIGS. 8a to 8d show details of holding device and engaging device.

FIG. 8a shows a mass-produced lock 37 in which is fitted a lock sensor 41 belonging to the control device (the lock sensor 41 can also be seen individually in a top view and a side view in FIG. 8b). The initiator or lock sensor 41 determines whether the pin 38 is in the first latch position of the lock 37, i.e. in the latch position in which the sliding door 1 is not yet fully in the closed position, but is already latched.

FIG. 8c shows a top view (view B) of parts of the engaging device from FIG. 6. Before the sliding door 1 is finally pulled shut (roughly when the bolt 38 is in the first latch position of the lock 37), the rod-like engaging element 18 and hole-like engaging element 19 are in the position shown in FIG. 8c. When the rod 18 is moved out of the hole-like element 19, the sloping surface of the tip 18a comes into contact with the peripheral surface of an annular roller 19a. The roller 19a is mounted rotatably relative to an axis which belongs to the engaging element 19. On movement of the rod 18 towards the engaging element 19, the sloping surface of the tip 18a slides over the peripheral surface 19a, and so the whole of the sliding door is pulled in direction 12, i.e. towards the closed position. In this case there can be rotation of the roller 19a.

FIG. 8d shows a top view of the engaging element 19. Here can be seen an opening 19b in which the rod 18 is guided. Also shown is the annular roller 19a. On both sides of the opening 19b are formed oblong bores which serve for adjustable fixing of the engaging element 19 to the wall 2.

The account of the engaging elements described above is meant only as an example. Naturally kinematic reversal is possible too (opening on the sliding door, rod on the wall). Any other engaging elements are also included in the invention, e.g. wedge surfaces sliding over each other, gears rolling over each other, etc.

Figure 9:
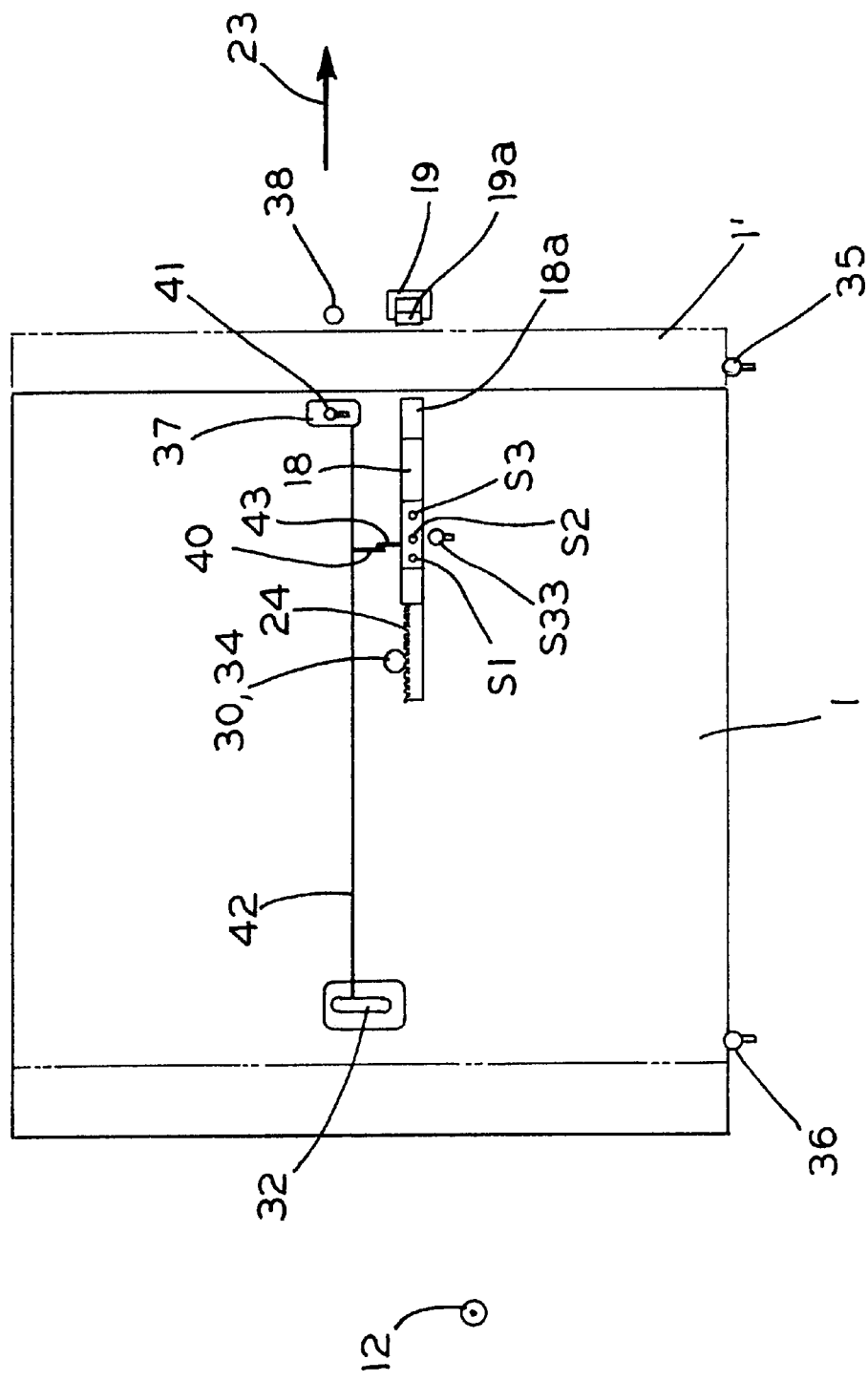

With reference to FIG. 9 the cooperation of control device, holding device and engaging device will be described below. FIG. 9 shows two door position sensors 35 and 36 for determining the position of the sliding door 1 relative to the wall 2. The door position sensors 35 belong to the control device. The first door position sensor 35 is arranged to detect the nearly closed state of the sliding door. The second door position sensor 36 is arranged to detect the nearly fully open state of the sliding door 1 relative to the opening 1'. The door position sensors 35 and 36 can be mounted e.g. in the region of the lower or upper guide rail (reference number 15 or 16). All the sensors described above can be designed in various ways. It is possible to use inductive, capacitive, mechanical or photometric sensors. Depending on the field of application, the sensors can in the present case preferably be designed as a reed contact, as micro switches or as light barriers.

The coupling between lock linkage 42 and rod 18 can be seen from FIG. 9. This connection is designed as a driver connection working in one direction. When the rack 18 is driven in direction 23 there is no entrainment of the lock linkage 42. When the rod 18 is driven in the direction opposite direction 23, the lock rod 42 is entrained, so that the lock 37 is unlatched. This driver connection can be accomplished e.g. by an eye bolt 43 located on the rack profile and an adjusting ring 40 attached to the lock linkage (see FIG. 7).

Below, the operating cycle of the individual components during opening and closing of the door is described.

The starting point is a fully open sliding door 1, i.e., the sliding door 1 and opening 1' do not overlap or overlap only slightly. By actuation of a switch e.g. on the inside of the door or on the dashboard, the linear drive is given a signal so that the sliding door is moved in direction 23, essentially parallel to the wall. This motor operation continues until the sliding door reaches the door position sensor 35, and in addition the lock 37 becomes engaged with the bolt 38, so that the first latch position is occupied, and this is detected by the lock sensor 41. The engagement sensor 33 up to this point was always in the center position, i.e. in the position in which the engagement sensor 33 is at the level of a marking S2. When the door position sensor 35 is tripped and at the same time the lock sensor 41 is tripped, the control device gives the electric motor 30 a signal so that the rod 18 is moved in direction 23 by means of the gear 34 and the rack profile 24. As a result, in the manner described in FIG. 8c the door is pulled or tilted in direction 12. Advance by the electric motor 30 takes place until the initiator 33 is at the level of a marking S1 of the rod 18. The distance between S2 and S1 or the slope and lateral offset between the engaging elements 18 and 19 is such that when the engagement sensor 33 is at the level of the marking S1 the door is always in the fully closed position. Now the electric motor 6 of the drive mechanism is switched off (in other embodiments it is also possible to switch it off briefly already beforehand) and the electric motor 30 receives from the control device a reverse signal, so that the rod is moved back into the center position S2 relative to the engagement sensor 33. Then the electric motor 30 is switched off. It is now possible e.g. with the mass-produced central locking system of a vehicle to lock the closed sliding door.

It should be noted that the direction of movement of the rod 18 was reversed after its entry into the engaging element 19 to bring the door into the closed position, and the rod is returned to the center position, so that in the closed position the rod 18 no longer protrudes laterally over the sliding door 1 or engages in the engaging element 19, so that the sliding door is no longer wedged.

For electric opening of the sliding door 1 e.g. a signal is given by a switch located in the handle 32 or a switch of the vehicle coated in the dashboard. Then the control device connected to these switches gives a signal to the electric motor 30 which then rotates in such a way that the rod 18 is moved in the direction opposite direction 13 out of the position of register of the engagement sensor 33 with the marking S2, until the marking S3 is reached. Due to the one-way driver connection 40', 42', outward movement of the lock linkage 42 takes place in this case, so that the lock 37 is fully unlatched and released the bolt 38. At the same time the control device gives a signal to the linear drive mechanism which is connected to it and which moves the sliding door 1 in the direction opposite direction 23 to the open position. If no signal to the contrary is given by the actuating switches on the dashboard or on the handle, the sliding door 1 moves into the fully open position, and the linear drive mechanism is finally switched off by the door position sensor 36.

As shown in FIG. 9, the engagement sensor 33 has three latch positions (S1, S2, S3) in tbs rod 18. It is possible to provide a stop e.g. to the left of S1 and to the right of S3. Thus it is e,g, possible that when the voltage supply is cut off and later the voltage supply is restored there is "self-location" of the rod 18 by means of the control device. Thus it is e.g. possible to provide a self-location programme which moves the rod in a predetermined direction as far as the stop and, after reaching this stop, initiates a change of direction of the electric motor 30 until the second latching takes place. When this is done, the rod 18 is in the center position S2 which is usually maintained by the rod (during closing operations for a short time the engagement sensor 33 is brought into register with the marking S1, during electric opening for a short time the engagement sensor 33 is brought into register with the marking S3, and after reaching this deflection the control device immediately initiates a signal to change the direction of the rod 18, so that again the center position S2 is brought into register with the engagement sensor 33).

The emergency opening properties of the sliding door according to the invention easily become clear from FIG. 9. On failure of the voltage supply it is possible to unlatch the lock 37 with the handle 32 by the lock linkage 42, the engaging device is not needed for this. Nor does it impede it, as the engaging rod 18 is in the position S2. During emergency opening only a slightly increased application of force is needed to open the door, in order to overcome the inertia of the drive mechanism.

In a further embodiment the control device can additionally have a control mode in which even after closing of the door the engaging device remains in the engaged position. This can be desirable if the motor vehicle is also transporting valuable goods.

The engaging device can also be used in connection with the control device as a pull-shut aid in the case of doors of motor vehicles which are not designed as sliding doors. Here the pull-shut aid works in the same way as was described above in connection with FIGS. 6 to 9; the motor vehicle door is simply pivoted and not slid.

What is claimed is:

1. A device in combination with a sliding door, a wall and an opening for opening and closing said opening in said wall, in particular for vehicles, wherein the sliding door is arranged so as to be slidable essentially parallel to the wall by a guide device and drivable by a linear drive which comprises a linearly constructed element, a driving element engaged therewith, an electric motor and a gear mechanism, wherein the linearly constructed element of the linear drive and a slide rail belonging to the guide device are attached to the wall, and the driving element of the linear drive and a slider belonging to the guide device and engaged with the slide rail are attached to the sliding door, wherein the slider is pivotally attached to the sliding door by a joint, said linearly constructed element of said linear drive is constructed as a rack, and said driving element of said linear drive is constructed as a gear rotatably mounted on said slider, said gear mechanism comprises a gear connected to said motor, a gear mounted rotatably on the joint axis between said slider and said sliding door, and said gear rotatably mounted on said slider, said gear mounted on the joint axis meshes with said gear connected to said motor and said gear mounted on said slider, said gear connected to said motor and said gear mounted on said slider being laterally offset from each other with respect to said joint axis to avoid contact with each other.

2. Device according claim 1, wherein the slide rail at one end extends as far as the opening and this end is curved in the direction of entry to the opening.

3. Device according to claim 1, wherein the linearly constructed clement of the linear drive and the slide rail are arranged on the wall in a groove of the wall behind the door opening.

4. Device according to claim 1, wherein the joint between the slider and the sliding door is constructed as a bolt connection.

5. Device according to claim 1, wherein the rack is rigidly connected to the slide rail which is made of metal.

6. Device according to claim 1, wherein the rack profile is pressed into the slide rail which is made of metal.

7. Device according to claim 1, wherein, to minimize the entry of dirt into the region of the linearly constructed element, the latter is partitioned off by co-rotating lamellea.

8. Device according to claim 1, wherein a holding device for fixing the sliding door in the closed position closing the opening, and an engaging device comprising two engaging elements that can be engaged with each other with mating slide surfaces for producing a door movement essentially perpendicularly to the wall, wherein one engaging element is arranged on the sliding door and the other engaging element is arranged on the wall and the engaging elements can be disengaged from each other in the closed position, and a control device connected to the engaging device for controlling the movement of the door, which controls the engaging elements as a function of fixing of the sliding door in the holding device in such a way that they become disengaged.

9. Device according to claim 8, wherein the holding device comprises a pin attached to the sliding door or to the wall, and a lock attached to the wall or to the sliding door, wherein the pin can be latched in the lock in such a way that in a first latch position a gap remains between the sliding door and the wall and in a second latch position when the sliding door is in the closed position.

10. Device according to claim 8, wherein one engaging element is constructed as an opening and the other engaging element is a rod and constructed with a beveled point, wherein at least one of the engaging elements can be driven by an electric motor.

11. Device according to claim 10, wherein the engaging element constructed as an opening comprises a rotatable annular roller in the region of contact with the rod.

12. Device according to claim 10, wherein the rod is arranged on the sliding door and slidable by a linear drive driven by the electric motor, wherein sliding of the rod relative to the door can be detected by the engagement sensor.

13. Device according to claim 8, wherein on at least one of the engaging elements is mounted an engagement sensor belonging to the control device for detecting the position of the engaging element.

14. Device according to claim 8, wherein the sliding door comprises a lock linkage that can be connected to the lock for unlatching the pin and lock.

15. Device according to claim 14, wherein the lock linkage is connected by a driver connection to the rod.

16. Device according claim 1, wherein the linearly constructed element of the linear drive at one end extends as far as the opening and this end is curved in the direction of entry to the opening.

17. Device according to claim 1, wherein, to minimize the entry of dirt into the region of the linearly constructed element, the latter is partitioned off by an elastic capsule seal provided in the region of the gear mechanism.

18. A device for pulling shut a sliding door of a motor vehicle closing an opening in a wall, in combination with the wall, the opening and the sliding door, comprising a holding device for fixing and closing the sliding door which includes a pin attached to the sliding door or wall and a lock attached to the wall or sliding door, wherein the pin in a first position latches in the lock in such a way that a sliding door movement in the direction of opening is blocked, hut a gap remains between the sliding door and wall, and in a second position the sliding door is in the closed position, wherein there is provided an engaging device comprising two engaging elements that can be engaged with each other with mating slide surfaces for producing a door movement essentially perpendicularly to the wall, wherein one engaging element is arranged on the sliding door and the other on the wall and the engaging elements can be disengaged from each other in the closed position and in that the engaging device is connected to a control device which controls the engaging elements as a function of the second position of the sliding door in such a way that they become disengaged.

* * * * *